(12) United States Patent
Harris

(10) Patent No.: US 11,134,042 B2
(45) Date of Patent: Sep. 28, 2021

(54) LETS MEET SYSTEM FOR A COMPUTER USING BIOSENSING

(71) Applicant: Scott C Harris, San Diego, CA (US)

(72) Inventor: Scott C Harris, San Diego, CA (US)

( * ) Notice: Subject to any disclaimer, the term of this patent is extended or adjusted under 35 U.S.C. 154(b) by 0 days.

(21) Appl. No.: 17/091,414

(22) Filed: Nov. 6, 2020

(65) Prior Publication Data

US 2021/0152502 A1 May 20, 2021

Related U.S. Application Data

(60) Provisional application No. 62/936,199, filed on Nov. 15, 2019.

(51) Int. Cl.
*H04L 12/58* (2006.01)
*G06F 3/0488* (2013.01)
*G06F 3/0484* (2013.01)

(52) U.S. Cl.
CPC .......... *H04L 51/046* (2013.01); *G06F 3/0488* (2013.01); *G06F 3/04842* (2013.01)

(58) Field of Classification Search
CPC .. H04L 51/14; G06K 9/2081; G06K 9/00335; G06Q 50/01; G06Q 10/10; G06Q 30/0621; G06F 16/637; G06F 3/14; H04N 1/00198; H04N 21/23412
See application file for complete search history.

(56) References Cited

U.S. PATENT DOCUMENTS

| 2005/0055639 A1* | 3/2005 | Fogg | G06Q 10/10 715/262 |
| 2015/0281443 A1* | 10/2015 | Kii | G10L 25/78 379/88.01 |
| 2015/0341297 A1* | 11/2015 | Barfield, Jr. | H04L 51/14 709/206 |
| 2015/0350621 A1* | 12/2015 | Sawa | H04N 21/23412 386/201 |
| 2016/0163079 A1* | 6/2016 | Lee | G06Q 30/0621 345/689 |
| 2016/0224591 A1* | 8/2016 | Kim | G06K 9/2081 |
| 2016/0234651 A1* | 8/2016 | Marcus | G06Q 50/01 |
| 2017/0140563 A1* | 5/2017 | No | H04N 1/00198 |
| 2017/0142367 A1* | 5/2017 | Nakano | G06F 3/14 |
| 2019/0045270 A1* | 2/2019 | Vats | G06K 9/00335 |
| 2020/0042552 A1* | 2/2020 | Mayes | G06F 16/637 |

* cited by examiner

*Primary Examiner* — Toan H Vu

(57) ABSTRACT

A greeting system for sending a let's meet greeting to another user. A computer, such as a cell phone, runs an application that creates a map of a room showing people in the room, and allows identifying another user in the room to whom a user of the application wants to send a greeting by selecting the another user from the map of the room. The user can then send an image of a body part communicating body language to the other user from the application. The body part images, can be a kiss or a wave.

19 Claims, 3 Drawing Sheets

LETS MEET SYSTEM FOR A COMPUTER USING BIOSENSING

This application claims priority from provisional application No. 62/936,199, filed Nov. 15, 2019, the entire contents of which are herewith incorporated by reference.

BACKGROUND

The so called "me too" movement has made it difficult, and let's face it dangerous, for men to make advances of any kind toward women. However, it will be understood that the survival of the species requires that members of the opposite sex make advances at one another. How is a man to know if a woman consents to a romantic advance? This same quandary is presented to all participants in same sex and opposite sex advances, by men and by women: how does anyone ever know if someone else is willing to receive such a romantic encounter? Taking the wrong step towards another person can be disastrous, either at the time of the encounter, or as recent events have borne out, even 2 or 3 decades later.

The holy Grail to avoiding problems of this sort, would be to obtain consent to a romantic encounter in some form that can be actually memorialized. However, some women or men might consider it sleazy to say in writing "okay, I consent to this romantic encounter.". In fact, it is quite common that people in relationships want to play "hard to get" as part of the cat and mouse game that is always existed as part of romantic relationships.

SUMMARY

The inventor recognizes that a computer can be used to obtain more subtle signals that indicate, if not perhaps outright consent to a romantic encounter, at least something from which a reasonable person might conclude that a romantic encounter is not wholly unwelcomed.

The present application describes systems which operate on portable devices which have computer processing capability, such as a cellular phone. The cellular phone attempts to obtain information from a user indicating that the user is willing to consider an advance from another person.

In another embodiment, images of different (preferably non-sexually oriented) body parts may be used to facilitate the advance.

DETAILED DESCRIPTION

Figure 1:
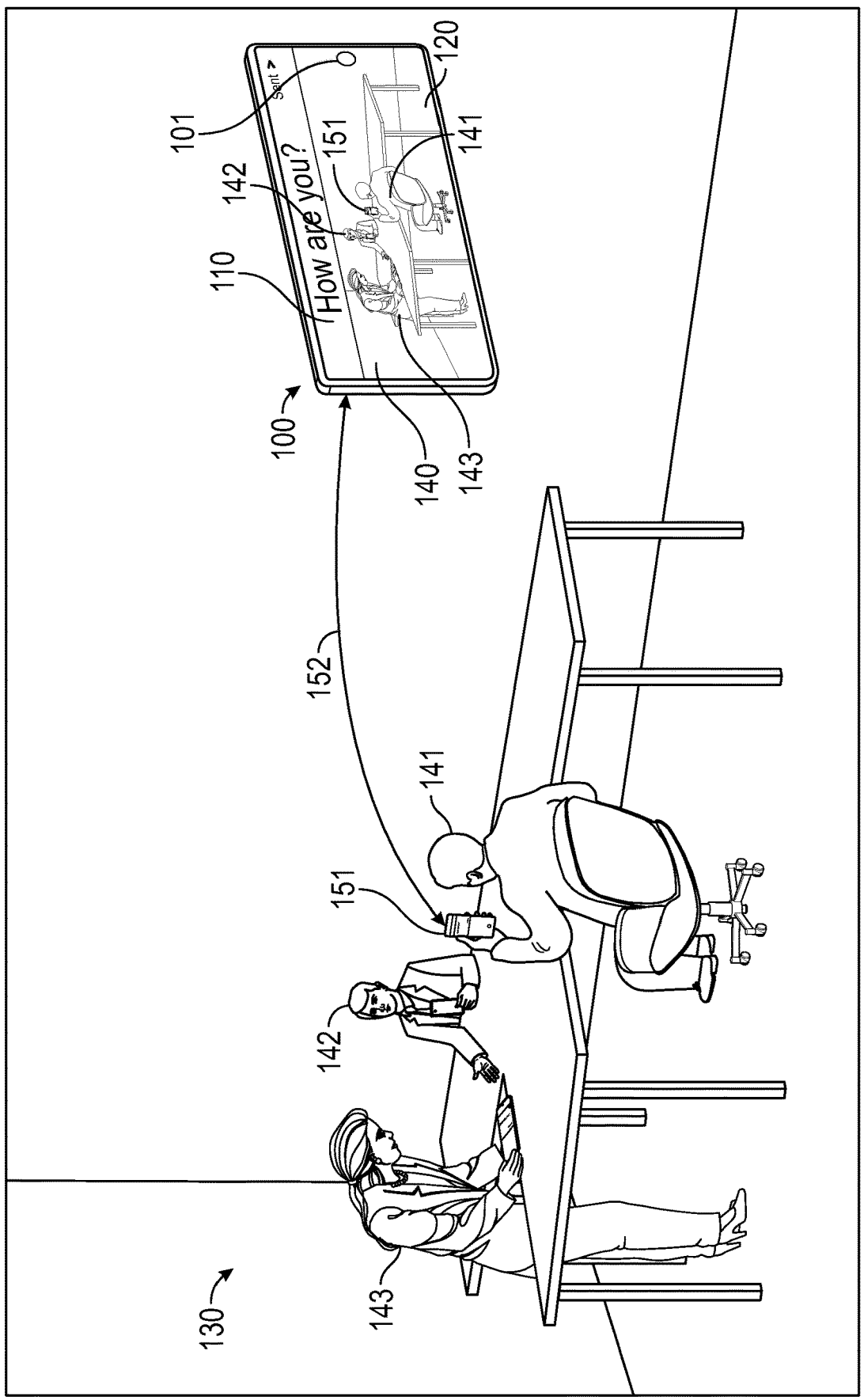
FIG. 1 shows a cellular phone with a screen showing a map of a room that is imaged by the cellular phone.

An embodiment starts off with the basic notion a first user may want to signal an advance or an initiation of contact with other people in the user's vicinity; in one embodiment; or with other people who are not in the user's vicinity but who the user has previously identified, in another embodiment.

In an embodiment, the electronic device is a mobile phone, however it should be understood that other electronic devices can be used for this purpose. The mobile phone 100 uses in its electronic capabilities to run an application on the processor 110 of the mobile phone, and to display information on the screen 120 of the mobile phone 120. In one embodiment, the processor and the capabilities of the mobile phone is used to create a map of a room 130, shown generically as 140 on the screen 120. The map 140 shows the different people in the room, including their approximate location in the room, and something that enables the user to identify who these people are.

For example, the room 130 has people 141, 142, 143, and those people 141, 142, 143 in the room 130 are also shown on the map 140 on the screen screen 120 of the cell phone 100. The room map 140 is formed by the cell phone using the camera, and also using information from apps on other people's (such as the people 141, 142, 143) phones communicating with one another, and/or from the presence of their mobile devices. For example, the user 141 may be holding a mobile device 151 which can also be detected by a Bluetooth proximity system or other detection system.

In general, by scanning all the mobile devices in the room, each user, and their mobile device can be identified. In addition to the ways described above, the map can use any sensor that can be provided in a mobile phone.

Each user, such as 141 may also be identified by a color identified by the camera or set on their app. For the example, if user 141 is wearing primarily a red color, user 141 may be shown in red on the screen map 140. Other ways of determining or indicating who is who to the user may also be used. For example, the user can identify who is who from location, from the color as described above, a likeness of the user can be used, including their body shape or length of hair or other likeness. Alternatively, the likeness of a user can be imported from an icon or picture set by the user as part of their profile on their phone app.

In general, the map 140 shown in FIG. 1 provides information about who is in the room and where they are.

Using the user 141 as indicative, we will assume that the first user, of the mobile phone 100, wants to send an exploratory message to the user 141 of the mobile phone 151.

In an embodiment, this can be done, for example, between apps running on both the phone 100 and 151, with communicating apps running on the phone 100 and running on the phone 151, and in this case the two phones can communicate in this way. The apps handle the exchange of information.

In one embodiment, short messages are exchanged between the phones, for example phone 100 may send a Bluetooth based short message to phone 151, which can essentially say "I am in the same room as you and I am sending you a short message". Phone 151 may then respond with an acknowledgment just indicating that it received the short message.

This can use a short message system (SMS), can use Wi-Fi direct, or can use any other wireless method of communicating directly between the phones from phone 100 to phone 151. The communication between phones can also be instrumental in creating the map 140.

The communication is shown generically as 152. Alternatively, the map can be created by other means such as radar or lidar, through Bluetooth connections, or in any other way.

Figure 2:
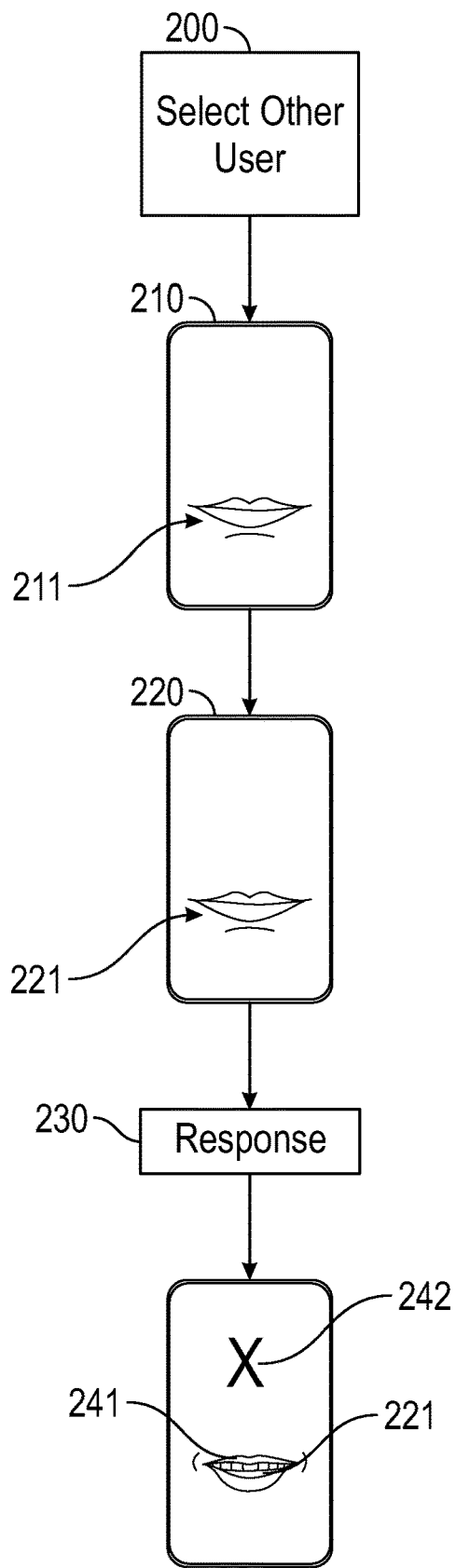
FIG. 2 shows a flowchart of selecting another user and sending a lip impression to that other user.

An embodiment of the app according to the flowchart of FIG. 2. In general, the app is operating to allow a user to take some action in their app, which is also communicated to the user of another app running on their mobile phone.

Embodiments as described herein describe using body language to communicate a greeting by sending an image of a body part communicating body language. As described herein, this can be reaching out your hand or throwing a kiss, for example, or any other kind of body language.

In one embodiment, shown in FIG. 2, the app is used to allow one user to obtain an image by a user touching a body part to a touchscreen of a phone. In this embodiment, the image is of a user's lips, used to "throw a kiss" to another user.

At 200, user one selects the "other" user. This can be done by selecting the other user on the map 140, or by writing text information indicative of the other user such as the color on the app, or some other unique information about the other user. While one embodiment uses the FIG. 1 system of identifying the other user at 200, it should be understood that any way of selecting another user can be used according to the system, including sending to the other user by name.

At 210, the user of the phone 'throws a kiss' by placing their lips in a designated location on the screen, shown as 211. This has the action of creating a corresponding image on the other screen 220 shown as 221, where a facsimile of the first users lips 211 from the first screen 210 are shown on the screen 220 of the other user indicating that the other user has received a thrown kiss. In some embodiments, the user can also receive a message saying you've been thrown a kiss.

In embodiments, the term image is used herein can refer to a still image, or a moving image, also called a video. Since a video is an image that is moving, the term image is intended to cover both image and video as well as an animation.

Now the other user, that is the one who is received the message, has the chance to make a response at 230. The response can be for example the other user placing a kiss back, by placing their lips directly over the lips from the thrown kiss, shown as 241 with lips directly over the first kiss 221.

Another action can be the user for example drawing an x on the screen shown as 242; or drawing a stop sign or drawing another blocking message, all of which can be taken as very easy to understand messages of "this is not a welcome request".

However, no real world physical contact has been made.

Body parts other than the lips can be used in this embodiment.

Figure 3:
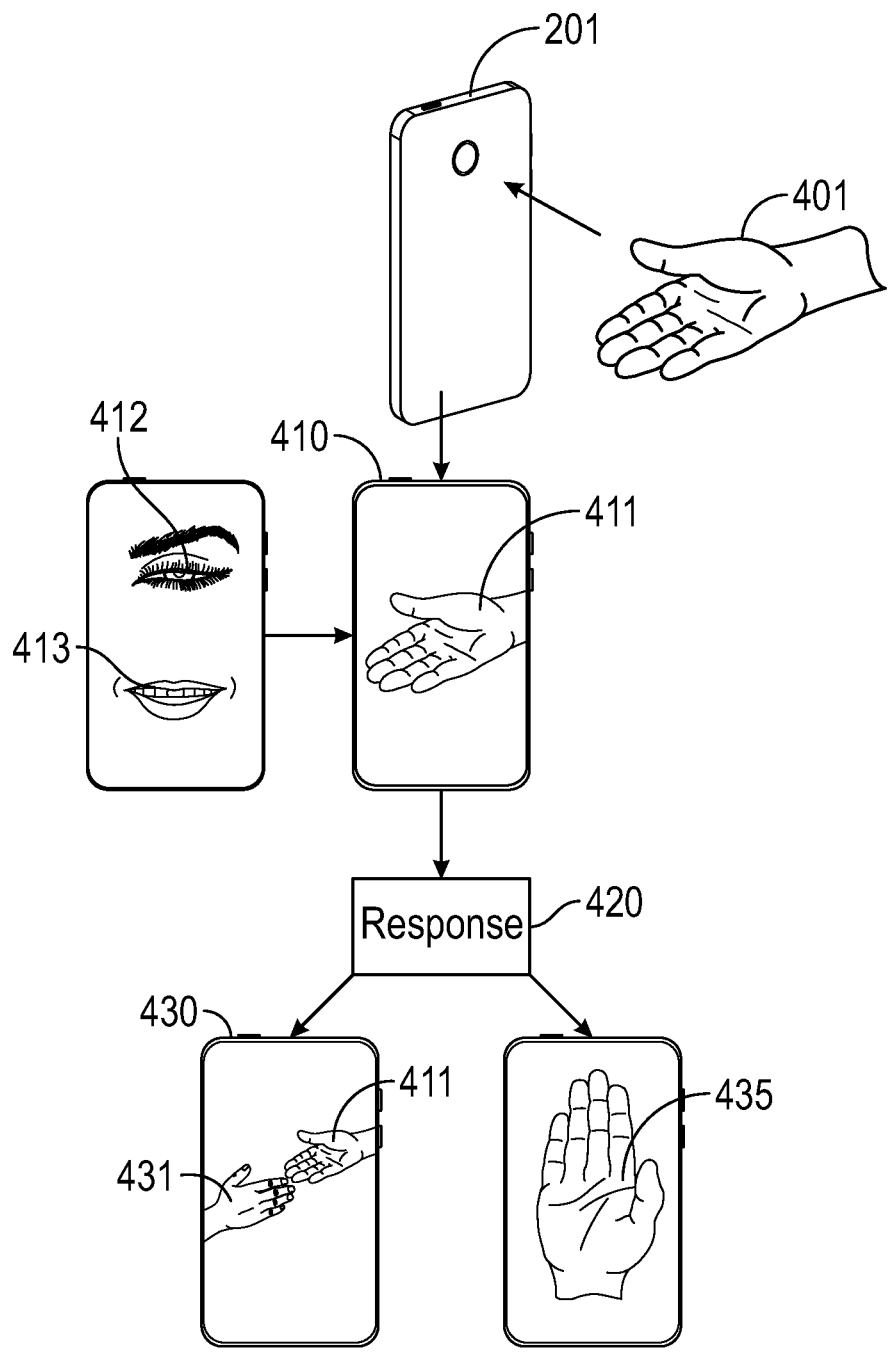
FIG. 3 shows a flowchart of sending other images of body parts that communicate body language indicative of a greeting to the other user.

Another embodiment, shown in FIG. 3, uses the phone's camera 201 to take a video of the user's hand 401 being extended. The video of the hand being extended is then sent to the screen 410 to the "other user" so that the other user sees a hand being extended to them. Now the other user at the screen 410 again has choices for their response at 420. The user can reach their hand back by taking a video of their hand correspondingly being extended back shown as 430. This can be animated for example as their hand 431 being reached towards the original hand 411. Alternatively, the user can raise their hand like a stop sign, the universal sign for halt at 435.

When the user reaches their hand back, it is just like in real life. You're not really sure what it means when someone reaches back, but it's a good sign, and certainly not a bad sign. It may mean I'm interested, I'm willing to talk to you, or you're nice, but it certainly doesn't mean go away and don't come back.

This can use a prestored animation instead of a real video of the real user's hand.

The above has described throwing a kiss, and reaching out a hand as two embodiments. However, it should be understood that other images of a body part communicating body language that indicates a greeting, could be used. Other exemplary body language body functions could be used such as an eye wink 412, smile 413, a or other body movements that have body language.

Other embodiments also described using a prestored animation, rather than the actual kiss. While the actual lips are better, because they show something, using a prestored animation of the lips can also show something, and is not all bad. Similarly, a prestored animation of reaching out your hand, and a prestored animation of reaching back may be used.

Users can store in their app different prestored animation of different things. For example it may be considered a lot less forward to reach out your hand rather than reaching out a lip. Rather than reaching out your hand, you could just wave hi, and see if the other person waves hi back.

In one embodiment, the system may work require using only specified kinds of body language, to avoid vulgar or suggestive body language being used in the app. For example, the system may only allow prestored animations to be used, and may limit the content of the prestored animations. The system may also be able to use images of body parts such as the lips or the hand, but not other body parts which may be considered more suggestive.

Although only a few embodiments have been disclosed in detail above, other embodiments are possible and the inventors intend these to be encompassed within this specification. For example, this can include other images of body parts communicating body language The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A greeting system for sending a greeting to another user, comprising:
   a computer, running an application that uses a camera to obtain an image of a room, and creates a map of the room, using the image, showing people in the room and locations of the people in the room on the map, and shows likeness information about each of the people in the room on the map, the likeness information representing information from which the user can identify the people in the room based on the display on the map, and allows identifying another user by selecting the another user from the map of the room, and allows the user to send a greeting to the another user, the greeting including an image of a body part communicating body language to the another user from the application.

2. The system as in claim 1, wherein the map is created by communicating with mobile devices of the people in the image in the room.

3. The system as in claim 2, wherein the application on the computer communicates with other applications on other computers of the other another user to create the map.

4. The system as in claim 1, wherein the image of the body part communicating body language is one of a plurality of prestored videos of body parts communicating a greeting.

5. The system as in claim 1, wherein the image of the body part communicating body language is an image obtained by a user touching a body part to a touchscreen.

6. The system as in claim 5, where the image of the body part uses an actual impression of the user's own lips.

7. The system as in claim 1, wherein the image of the body part communicating body language is an image of the user extending their hand for a handshake.

8. The system as in claim 7, wherein the image of the user extending their hand for a handshake comprises obtaining a video of the user extending their actual hand, and sending that video to the another user.

9. The system as in claim 1, wherein the image of the body part communicating body language is an eye wink.

10. A computer based system for sending a greeting to another user, comprising:
a computer, running an application that uses a camera to obtain an image of a room, and creates a map of the room, using the image, showing people in the room and locations of the people in the room on the map, and shows likeness information about each of the people in the room on the map, the likeness information representing information from which the user can identify the people in the room based on the display on the map, and allows identifying another user to whom a user of the application wants to send a greeting from the map of the room showing the people in the room by selecting the another user from the map of the room, and sending a greeting to the another user.

11. The system as in claim 10, wherein the greeting sends an image of a body part communicating body language to the another user from the application.

12. The system as in claim 10, wherein the image of the body part communicating body language is an image obtained by a user touching a body part to a touchscreen.

13. The system as in claim 12, where the image of the body part uses an actual impression of the user's own lips.

14. The system as in claim 10 wherein the likeness information is a color of clothing that the user is wearing, obtained from an image of the room.

15. A computer system for sending a greeting to another user, comprising:
a computer, running an application that creates a map of a room showing people in the room, and allows identifying another user in the room to whom a user of the application wants to send a greeting by selecting the another user from the map of the room, and
the computer sending an image of a body part communicating body language to the another user from the application,
wherein the image of the body part communicating body language is an image obtained by a user touching their body part to a touchscreen of the computer.

16. The system as in claim 15, wherein the application uses a camera to obtain an image of a room, and creates a map of the room, using the image, showing people in the room and locations of the people in the room on the map, and shows likeness information about each of the people in the room on the map, the likeness information representing information from which the user can identify the people in the room based on the display on the map, and allows identifying another user by selecting the another user from the map in the room.

17. The system as in claim 15, where the image of the body part uses an actual impression of the user's own lips.

18. The system as in claim 10, wherein the likeness information is an image of the user in the room obtained using the camera.

19. The system as in claim 1, wherein the likeness information is a color of clothing that the user is wearing.

* * * * *